Sept. 25, 1928.
C. F. RODIN
1,685,295
VEHICLE SUSPENSION
Filed May 24, 1926
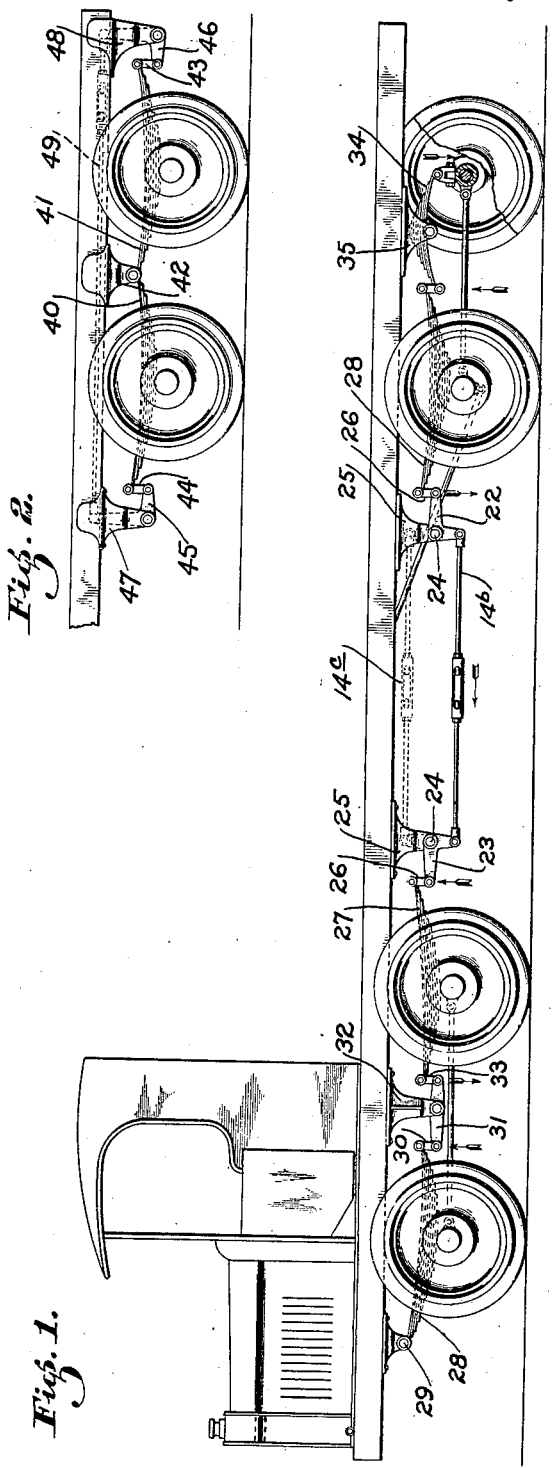
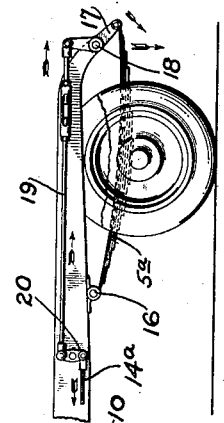
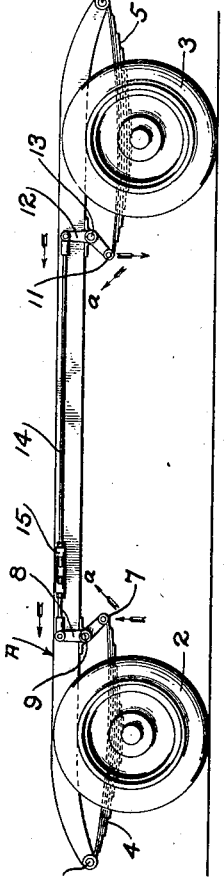
INVENTOR.
Charles F. Rodin.
BY
Townsend, Loftus & Abbott
ATTORNEYS.

Patented Sept. 25, 1928.

1,685,295

UNITED STATES PATENT OFFICE.

CHARLES F. RODIN, OF SAN FRANCISCO, CALIFORNIA, ASSIGNOR TO CALIFORNIA SIX WHEEL COMPANY, OF OAKLAND, CALIFORNIA, A CORPORATION OF CALIFORNIA.

VEHICLE SUSPENSION.

Application filed May 24, 1926. Serial No. 111,097.

This invention relates to vehicle suspensions employing four or more wheels, and particularly to a spring suspension between the chassis frame and the wheels whereby the riding qualities of the vehicle may be materially improved and load distribution insured.

The object of the present invention is to generally improve and simplify the construction and operation of spring suspensions for vehicles; to reduce the transmission of road shocks to the frame; to improve the riding qualities of the vehicle; to provide means whereby the tension of the springs may be increased or decreased to take care of varying loads; and further to provide a spring suspension whereby a load placed on the chassis frame may be equally distributed to the wheels and the road surface.

The invention is shown by way of illustration in preferred modified form in the accompanying drawings, in which—

Fig. 1 is a side elevation of a motor vehicle, showing one form of spring suspension.

Fig. 2 is a side elevation of the rear end of a vehicle, showing another form of spring suspension.

Fig. 3 is a side elevation of a vehicle, showing still another form of spring suspension.

Fig. 4 is a side elevation of the rear end of a vehicle, showing a modified form of the spring suspension illustrated in Fig. 3.

Referring to the drawings in detail, and particularly to Figs. 3 and 4, A indicates the main frame of a vehicle, 2 the front wheels, 3 the rear wheels, 4 semi-elliptical springs interposed between the frame and the front wheels, and 5 a semi-elliptical spring interposed between the main frame and the rear wheels. The front spring 4 is in this instance pivotally secured at its forward end to the main frame as indicated at 6. The center portion of the spring is secured to the front axle in the usual manner, and the rear end of the spring is pivotally secured, as at 7, to a crank arm which in turn is pivotally secured, as at 9, to the main frame. The crank arm 8 serves the function of a spring shackle, and it also serves the function of transmitting flexing movement of the spring 4 to the rear spring 5, as will hereinafter be described.

The rear end of the spring 5 is pivotally secured to the rear end of the frame as at 10. The center portion of the spring is secured to the rear axle in the usual manner and the forward end of the spring is pivotally secured, as at 11, to a crank arm 12, which is pivotally secured to the main frame as at 13.

The crank arms 8 and 12 have upwardly extending arms, as shown, and these are connected by a link or rod 14, which is pivotally secured at the respective ends to the extended crank arms. The rod 14 is also provided with a turn-buckle, as indicated at 15, and the length of the rod may thus be increased or decreased to change the position of the crank arms. That is, by turning the turn-buckle 15 in a direction which will tend to shorten the rod 14, the lower ends of the crank arms will swing in a direction reverse to the arrows indicated at a, and will thereby tend to curve the springs or increase the tension of the same, thereby permitting heavier loads to be placed on the frame. Conversely, if the vehicle is operating with a light load, the turn-buckle is turned in the opposite direction and the crank arms 8 and 12 will then swing about their pivots 9 and 13 in the direction indicated by the arrows a, thereby decreasing the tension on the springs and permitting a greater resiliency to take care of the lighter load.

The crank arms, together with the connecting rod 14, also serve other functions; for instance, that of reducing the transmission of road shocks to the frame. For instance, if the front wheels pass over an obstruction or road surface undulation, the spring 4 will either be compressed or extended. Such movement is transmitted through the crank arm 8 and rod 14 to the crank arm 12 and the spring 5, and the shock is thus defused and is not directly transmitted to the frame; the riding qualities of the vehicle being thus materially improved.

Again, if a load is placed on the vehicle, it will be noted that it is transmitted to both the front and the rear wheels. If the load is placed near the rear end of the frame, it tends to compress or flatten the spring 5. Such compression or extension of spring 5 is transmitted through the rocker arm 12 and rod 14 to the rocker arm 8, and the front spring 4 is accordingly compressed or extended in proportion to the amount of load applied.

The spring suspension illustrated accordingly causes equalization of load distribution to the wheels and the road surface; it reduces transmission of road shocks to the frame or chassis; it materially improves the riding qualities of the vehicle, and it permits the tension of the springs to be increased or decreased to take care of varying loads.

The spring suspension shown in Fig. 4 is the same in operation as that indicated in Fig. 3, the only difference being that the rear spring 5ᵃ is pivotally attached to the frame at its forward end, as indicated at 16, while the rear end is connected to a crank arm 17 which is pivotally attached to the frame as at 18. This crank arm transmits movement to the rod 14ᵃ through a secondary rod 19 and a crank arm 20.

In Figs. 1 and 2, the same type of spring suspension is again illustrated, it being, however, shown as applied to front and rear wheels which are arranged in pairs; for instance, an eight-wheel vehicle, as shown in Fig. 1, or a six-wheel vehicle, as shown in Fig. 2. In Fig. 1, rod 14ᵇ is connected to crank arms 22 and 23. These crank arms are pivotally mounted as at 24 on brackets 25 secured to the main frame. The bell cranks carry spring shackles, as shown at 26, and these are connected to the semi-elliptical springs shown at 27 and 28. The rearmost set of wheels of the front group is supported by the semi-elliptical spring 27 and the front wheels by semi-elliptical spring 28. This spring is pivotally attached to the main frame at its forward end as at 29 and the rear end is connected through a shackle 30 with a crank arm 31, which is pivotally attached to the frame through a bracket 32, the rear end of this crank arm being connected through a shackle 33 with the front end of the spring 27. A similar spring suspension is shown for the rear wheels, the only difference being that the crank arm 31 is substituted by a reverse semi-elliptical spring 34 which is pivotally attached to the frame through means of a bracket 35. With a six or eight-wheel drive such as shown in Figs. 1 and 2, it is possible to obtain equal load distribution to the wheels and the road surface, and it is also possible to increase or decrease the tension of the springs and to improve the riding qualities.

The crank arms 22 and 23 shown in Fig. 1 may be reverse if desired so as to elevate the rod 14ᵇ to the dotted line position indicated at 14ᶜ, this being resorted to if it is desired to increase road clearance. The changing of the position of the bell cranks, however, does not affect the operation.

In Fig. 2, two sets of springs are employed as indicated at 40 and 41. These are centrally and pivotally connected to a bracket 42, while the opposite ends are connected through shackles 43 and 44 with bell cranks 45 and 46. These bell cranks are pivoted in brackets 47 and 48 which are secured to the frame and the upper ends of the bell cranks are connected with a connecting rod 49. With such an arrangement the same results are obtained as with the structure shown in Figs. 3 and 4.

Having thus described my invention, what I claim and desire to secure by Letters Patent is—

1. In a vehicle suspension of the character described, a main frame, a front and a rear wheel, supporting the frame, a semi-elliptical spring interposed between each wheel and the frame, a pivotal connection between one end of each spring and the frame, a pair of bellcranks pivotally attached to the frame, one adjacent the front spring and one adjacent the rear spring, said bellcranks having their lower ends disposed on an angle of substantially 45° with relation to the frame and their upper ends, substantially vertically arranged with relation to the frame, a link pivotally connecting the upper vertical ends of the bellcranks, and a pivotal connection between the lower angularly disposed end of each bellcrank and an adjacent spring.

2. In a vehicle suspension of the character described, a main frame, a front and rear wheel supporting the frame, a semi-elliptical spring interposed between each wheel of the frame, a pivotal connection between the front end of the frame and the front spring, a pivotal connection between the rear end of the frame and the rear spring, a pair of bellcranks pivotally attached to the frame, one adjacent the rear end of the front spring and one adjacent the front end of the rear spring, said bellcranks having their lower ends disposed on an angle of substantially 45° with relation to the frame and reversed with relation to each other so that the lower end of the bellcrank which is disposed adjacent the front spring points rearwardly and the lower end of the bellcrank which is disposed adjacent the rear spring points forwardly, a pivotal connection between the rear end of the front spring and the adjacent bellcrank, a pivotal connection between the front end of the rear spring and the adjacent bellcrank, said bellcranks having their upper ends substantially vertically disposed with relation to the frame, and a link pivotally connecting the upper ends of the bellcranks.

CHARLES F. RODIN.